United States Patent [19]
Colvin

[11] Patent Number: 4,812,487
[45] Date of Patent: Mar. 14, 1989

[54] AMES-NEGATIVE DIAMINE CURATIVE FOR POLYURETHANES

[75] Inventor: Howard A. Colvin, Tallmadge, Ohio

[73] Assignee: The Goodyear Tire & Rubber Company, Akron, Ohio

[21] Appl. No.: 168,282

[22] Filed: Mar. 15, 1988

[51] Int. Cl.$^4$ ............................................ G08G 18/28
[52] U.S. Cl. ..................................... 521/159; 528/63; 528/75; 528/76; 528/80; 528/83; 521/163
[58] Field of Search ...................... 528/63, 75, 76, 80, 528/83; 521/159, 163

[56] References Cited
PUBLICATIONS

Chemical Abstracts: 106 (14): 103244u.
Chemical Abstracts: 78 (1): 3926c.
Chemical Abstracts: 108 (20): 168119t.
Chemical Abstracts: 63:8257a.

Primary Examiner—Maurice J. Welsh
Assistant Examiner—L. Henderson
Attorney, Agent, or Firm—Bruce J. Hendricks; D. O. Nickey; Alvin T. Rockhill

[57] ABSTRACT

There is disclosed polyurethane reaction mixtures containing a novel aromatic diamine as a curative. This invention is also concerned with cured polyurethanes prepared by reacting the aromatic diamine of this invention with a mixture of organic polyisocyanate and polymeric polyol containing an excess of said polyisocyanate or with a prepolymer of said polyisocyanate and a polymeric polyol. The use of the curative of this invention provides sufficient pot life for making castings as well as foams.

7 Claims, No Drawings

AMES-NEGATIVE DIAMINE CURATIVE FOR POLYURETHANES

TECHNICAL FIELD

This invention is primarily concerned with the use of an aromatic diamine as a curative in polyurethane compositions. More specifically, this invention is concerned with a replacement for the commonly used and potentially carcinogenic methylene-bis-o-chloroaniline, also known as MOCA in polyurethane compositions.

BACKGROUND ART

Diamines play a unique part in shaping the characteristics and structure of polyurethanes. The polyurethane extending, crosslinking and curing effects are typically unpredictable in a manner similar to catalysis in the hydrocarbon catalytic polymerization art. Polyurethane compositions obtained by curing liquid isocyanato-terminated prepolymers with diamines are finding increased use in diverse applications requiring castable elastomers. Because of their abrasion resistance, they are frequently used as coatings on surfaces subject to mechanical wear. The use of polyurethanes has been somewhat restricted due to difficulties encountered in the curing process with the diamine curing agents currently available. One major difficulty with a most popular diamine currently available is that it is potentially toxic.

The most commonly used amine curing agents are hindered or substituted aromatic diamines of which 3,3'-dichlorobenzidine and 4,4'-methylene-bis-(2-chloroaniline), also known as MOCA, are representative. MOCA is an effective and well known extender or curative for polyurethanes. Unfortunately, the material is believed to be carcinogenic. This invention describes the preparation of two materials which have shown negative Ames tests but still cured polyurethanes in a manner similar to MOCA.

U.S. Pat. No. 3,640,955 discloses high molecular weight polyurethanes based on condensing di- or trinuclear N,N'-dialkyldiamines with bifunctional carbonic acid derivatives. More specifically, this patent discloses a polyurethane resin in which all nitrogen atoms are substituted by methyl groups or ethyl groups. The U.S. Pat. No. 3,640,955 fails to disclose or appreciate that the curatives of this invention can provide polyurethanes of excellent physical properties without the dangers attendant with curatives such as MOCA.

U.S. Pat. No. 3,734,896 relates to a process and products resulting from curing polyisocyanate prepolymers with either HCN, mixtures of HCN and one or more polyisocyanates with polycyanoformamides, all in the presence of a suitable catalyst, such as CN— and tertiary amines.

U.S. Pat. No. 3,897,400 discloses cured polyurethanes prepared by reacting 4,4'-diaminodiphenylsulfide with a mixture of organic polyisocyanate and polymeric polyol containing an excess of said polyisocyanate or with a prepolymer of said polyisocyanate and polymeric polyol.

U.S. Pat. No. 3,905,944 discloses the use of 4,4'-diaminodiphenyldisulfide as a curative for polyurethane reaction mixtures.

U.S. Pat. No. 3,926,919 discloses polyurethane compositions cured by reacting 2,2'-diaminodiphenyldisulfide with an isocyanate terminated polyol.

The use of aromatic diamines such as MOCA is well known as is the use of 4,4'-methylenedianiline, some times known as MDA. For typical commercial applications, however, the MDA reacts too fast and MOCA is a suspected carcinogen.

In accordance with this invention, it has been discovered that substitution of a single aromatic diamine of the structural formula:

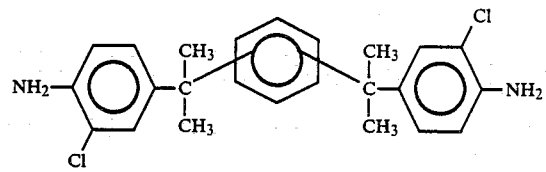

for MOCA or MDA curatives provides cured polyurethane compositions which possess excellent physical properties. The curative of this invention may be used with isocyanate terminated polyol, polyurethane-prepolymers and do not need a catalyst at room temperature to provide a reaction rate suitable for most commercial applications.

DISCLOSURE OF THE INVENTION

There is disclosed a cured polyurethane prepared by reacting an aromatic diamine of the structural formula:

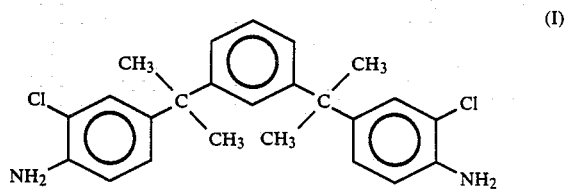

(I)

or

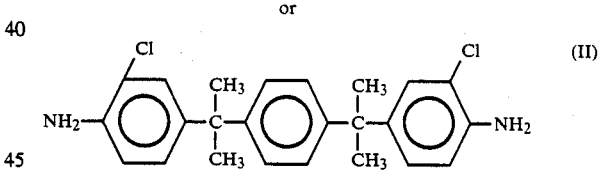

(II)

with (A) a mixture of an organic polyisocyanate having an isocyanate functionality of 2 to 3 with a polymeric polyol having a hydroxyl functionality of 2 to 3 and a molecular weight in the range of about 500 to about 6000 with a ratio of isocyanate groups of said polyisocyanate to hydroxyl groups of said polymeric polyol is in the range of about 1.3:1.0 to about 5:1 or (B) the reaction product of said polyisocyanate and said polymeric polyol.

There is also disclosed a heat curable polyurethane composition consisting essentially of a prepolymer of an organic diisocyanate and a hydroxy terminated polyether or polyester having a molecular weight of from about 150 to 30,000 and an aromatic diamine hardener for said polyurethane composition selected from the compounds having the structural formulae I and II. Said prepolymer and hardener being present in an amount to provide a ratio of primary amine to isocyanate of from about 0.85:1.0 to 1:1.

The polyurethane reaction mixtures used in this invention are typically liquid mixtures with the addition of a solvent commonly used to prepare polyurethanes.

A prepolymer or quasi-polymer technique can be used. The quasi-prepolymer method differs from the prepolymer method in that only a portion of the polyol is initially reacted with the polyisocyanate with the remainder then being added and reacted to form the prepolymer. The prepolymer is then cured or extended with the aromatic diamine of this invention.

The aromatic diamine curative of this invention, the polyols and the polyisocyanates are typically reacted at a temperature in the range of about 20° to about 170° C. and preferably in the range of about 50° to 120° C. Methods generally known for the preparation of polyurethane reaction mixtures with or without the aid of solvents can be used.

The aromatic diamine curatives of this invention having structural formulae I and II above have a unique curative reactivity which allows for improved processing in many commercial applications. The unique aromatic diamine curative for polyurethanes of this invention mainly differ from MOCA and MDA primarily by the diisopropylbenzene moiety between two o-chloroaniline radicals. It is surprising that the aromatic diamines of this invention can be used to prepare cured polyurethanes without the need of reaction rate modifiers which might have been necessary with other well known practical curatives. MDA normally needs something to slow its rate or must be used in fast application automated types of processes.

In unique situations, if desired, a catalyst can be used with the aromatic diamine curative of this invention such as the well known tertiary amines, the tin salts of fatty acid and accelerators such as mercaptobenzothiazole and carboxylic acids.

In the practice of this invention, the reactive hydrogen containing polymeric material used in the preparation of the polyurethanes themselves typically comprises at least one member selected from the group consisting of polyester polyols, polyether polyols, and hydroxyl-terminated unsaturated polymeric polyols. The hydroxyl-terminated unsaturated polymeric polyols typically have a molecular weight of from about 2000 to about 4000 and a hydroxyl functionality of from about 2 to about 3. The reactive hydrogen-containing material generally used, other than the hydroxy-terminated unsaturated polymeric polyol, has a molecular weight in the range of from about 700 to about 5000, and usually from about 1000 to about 3000. (If the molecular weight of the reactive hydrogen-containing material is too low, the polyurethane will not have sufficient elasticity.) Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

Further examples of polyesters are caprolactone polyesters. The caprolactone polyesters are substantially linear, hydroxyl-terminated polymers prepared by reacting a caprolactone having 6 to 8 carbon atoms, preferably 6 carbon atoms, with a glycol having 4 to 7 carbon atoms and preferably 4 to 6 carbon atoms. Various suitable caprolactones include ε-caprolactone, zetacaprolactone and etacaprolactone. Alkyl substituted caprolactones can be used with alkyl substituents containing 1 to 2 carbon atoms selected from methyl and ethyl radicals such as methyl ε-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55 respectively.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylenearyl ether glycols or triols, polytetramethylene ether glycols, polyalkylene etherthioether glycols or triols and alkyd resins. Generally the polytetramethylene ether glycols are the preferred polyether glycols.

It is usually preferred that the hydroxyl-terminated unsaturated polymeric polyol has a molecular weight of from about 2000 to about 4000 and a corresponding hydroxyl number of from about 50 to about 25. The hydroxyl-terminated unsaturated polymeric polyols used in this invetion are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have a hydroxyl functionality of from about 2 to about 3 and usually from about 2.1 to about 2.8. The preferred hydroxyl-containing polymeric polyols are polybutadiene polyols, polyisoprene polyols, butadiene-styrene copolymer polyols having about 70 to 90 percent units derived from butadiene and about 30 to 10 percent units derived from styrene and also butadiene-acrylonitrile copolymer polyols.

The organic polyisocyanates used in this invention having 2 to 3 isocyanato groups particularly include various organic diisocyanates and mixtures thereof as well as polyisocyanates having 2.3 to 2.7 isocyanato groups. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 1,6-hexamethylene diisocyanate, 1,10-decamethylene diisocyanate, 1,4-cyclohexyl diisocyanate, 4,4'-methylene-bis(-cyclohexylisocyanate), 3,3'-dimethyl-4,4'-diphenylmethane diisocyanate and 1,5-tetrahydronaphthalene diisocyanate and mixtures of such diisocyanates. For the purposes of the present invention, the toluene diisocyanates, diphenylmethane-4,4'-diisocyanate, 3,3'-dimethyl-4,4'-bis-phenylene diisocyanate, 4,4'-methylenebis(- cyclohexylisocyanate) and 3,3'-dimethyl-4,4'-diphenylmethane diisocyanate are preferred. For convenience, these diisocyanates are referred to as TDI, MDI, TODI, H₁₂MDI and DMMDI, respectively.

Various non-reactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene and the liquid lower ketones such as acetone, methyl ethyl ketone, methyl isobutyl ketone and diisobutyl ketone. Mixtures of solvents may also be used to obtain satisfactory spreading properties and evaporation rates when a polyurethane spray composition is applied to a polymeric surface.

The practice of this invention is further illustrated by reference to the following examples which are intended to be representative rather than restrictive of the scope of the invention. Unless otherwise indicated all parts and percentages are by weight.

In general the compounds of this invention are prepared through reacting o-chloroaniline with meta or para diisopropenylbenzene or meta or para α,α'-dihydroxy-diisopropylbenzene. The reaction may be catalyzed with an acid or an acid clay.

EXAMPLE 1

Preparation of Crosslinker

Into a 3 necked, 3 liter flask equipped with a mechanical stirrer, nitrogen inlet, thermometer and a Dean Stark trap was placed 900 grams (7.05 moles) of o-chloroaniline, and 100 grams (0.515 moles) of bis-α,α'-dihydroxyl-p-diisopropylbenzene, also known as 1,4-(α,α,α',α'-tetramethylbenzenedimethanol) of the structural formula:

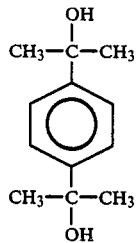

(IV)

and 15 grams of Super Filtrol #1 acid clay. The flask was flushed with nitrogen and the mixture was reflux for three hours at about 210° C. The water of reaction produced as a result of the condensation was separated and the o-chloroaniline was returned to the reactor. The mixture was cooled to 100° C. and filtered through Celite to remove the catalyst. Removal of the excess o-chloroaniline by distillation left 162.5 grams of the crude product for a yield of about 76%. The material was recrystallized twice from isopropyl alcohol to yield 83.6 grams of pure material with a melting point of 182° to 186° C.

EXAMPLE 2

Preparation of Crosslinker

Into the reactor system described in Example 1 was placed 1,020 grams (8.0 moles) of o-chloroaniline, 100 grams (0.63 moles) of meta-diisopropenylbenzene of the structural formula:

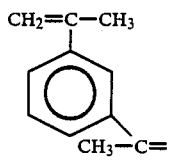

(III)

and 10 grams of Super Filtrol #1. The reactor was flushed with nitrogen and the reaction mixture was refluxed for 5 hours at 210° C. The mixture was cooled to 80° C. and filtered through Celite to remove the catalyst. After removal of the excess o-chloroaniline by distillation, the resulting liquid still contained about 6% o-chloroaniline. Washing with hot water removed the remaining o-chloroaniline and caused the product to solidify. The material was dissolved in ether and the solution was dried over sodium sulfate. Evaporation of the ether left about 180 grams of a red liquid which solidified on standing. The solid was recrystallized from isopropyl alcohol to provide a compound with a melting point of 112° to 115° C.

EXAMPLE 3

Evaluation of Crosslinkers

The urethane prepolymers used in this study were Adiprene ®L-100 and Adiprene ®8090. Adiprene ®L-100 and 8090 are products of the E. I. du Pont de Nemours Company, Inc. Adiprene ®L-100 is a linear isocyanate terminated polymer containing approximately 4% reactive isocyanate. It is stable in the absence of moisture, pale yellow in color and has a consistency of honey. Adiprene ®8090 is a polyester toluene diisocyanate terminated polymer.

The Adiprene ® prepolymers L-100 and 8090 were both heated to about 200° F. The crosslinker of Example 2 (the meta-isomer) was heated to slightly higher than its melt point, about 110° C., and mixed into 100 grams of the respective prepolymer at an amine to isocyanate ratio of 0.90. The mix viscosity of the polyester system appeared to be somewhat higher than the corresponding polyether prepolymer mix. Both these systems were cast and drawn down on 12"×6"×1/32" Teflon coated mold plates and cured overnight at 250° F. unless otherwise noted. The samples were then submitted for physical testing such as Shore A, tensile, elongation, tensile modulus and die C tear.

Table I sets forth the physical properties on these samples along with certain control samples.

TABLE I

POLYURETHANE COATING FORMULATIONS AND PHYSICAL PROPERTIES

| | Control-1[3] | Control-2[2] | PU-1 | PU-2 |
|---|---|---|---|---|
| Formulations (pbw) | | | | |
| L-100 Prepolymer | 100 | — | 100 | — |
| 8090 Prepolymer | — | 100 | — | 100 |
| MOCA | 12.1 | 12.4 | — | — |
| Product from Ex. 2 | — | — | 19.62 | 20.22 |
| Physical Properties | | | | |
| Tensile (MPa) | 20.95 | 49.64 | 11.23 | 34.29 |
| % Elongation at Break | 314 | 510 | 600 | 592 |
| Modulus (MPa) | | | | |
| At 100% Elongation | 8.82 | 7.58 | 1.28 | 1.77 |
| At 300% Elongation | 19.24 | — | 2.03 | 3.52 |
| At 500% Elongation | — | 14.13 | 3.79 | 15.12 |
| Crescent Tear (N/m × 10²) | 754 | 1068.1 | 178.6 | 271.4 |

TABLE I-continued
POLYURETHANE COATING FORMULATIONS AND PHYSICAL PROPERTIES

|  | Control-1[3] | Control-2[2] | PU-1 | PU-2 |
|---|---|---|---|---|
| Shore A Hardness | 90 | 90 | 65 | 80 |

NOTES:
[1] Amine level = 0.9 for all formulations.
[2] Data from supplier literature.
[3] Data from actual test [cure at 212° F. for 17 hours].

The information contained in Table I demonstrates that the polyester system cured with the diamine of the instant invention exhibited tensile physical properties superior to the polyether system along with desirable high elongation properties (PU-2 vs. Control-1). The polyester system should possess generally excellent oil resistance. In general, the data reported supports the contention that the crosslinkers of this invention are suitable curatives for polyurethane systems.

As discussed previously, one major concern with the use of MOCA is its reported toxicity. It is, therefore, quite surprising that the crosslinkers of this invention do not evidence the mutagenicity of MOCA.

The compounds produced in Examples 1 and 2 were evaluated for mutagenicity using salmonella typhimurium TA98, TA100, TA1535 and TA97. This evaluation for mutagenic activity was conducted both in the presence and absence of mammalian metabolic activator enzymes. These tests were conducted according to Health, Safety and Government Compliance Test Method 80-10 and the compounds of Examples 1 and 2 were not mutagenic to salmonella typhimurium.

Industrial Applicability

The use of the compounds of this invention as substitutes for the commercially accepted MOCA and MDA curatives are very apparent to those skilled in the art. Most interesting and unexpected is the non-mutagenic activity of the compounds of this invention when compared to the very similar MOCA compound. There is a long felt need in the industry for a substitute which would not cause detrimental health and environmental concerns.

While certain representative embodiments and details have been shown for the purpose of illustrating the invention, it will be apparent to those skilled in this art that various changes and modifications may be made therein without departing from the scope of the invention.

What is claimed is:

1. A cured polyurethane prepared by reacting an aromatic diamine of the structural formula:

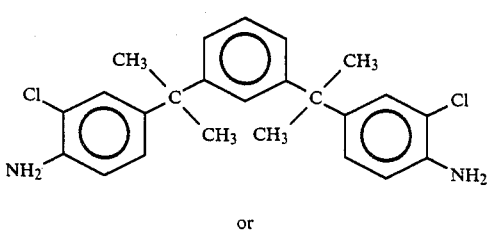

(I)

or

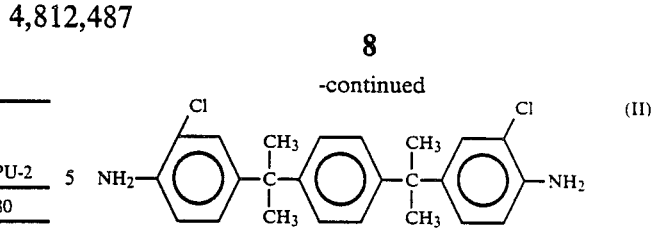

(II)

with (A) a mixture of an organic polyisocyanate having an isocyanate functionality of 2 to 3 with a polymeric polyol having a hydroxyl functionality of 2 to 3 and a molecular weight in the range of about 500 to about 6000 with a ratio of isocyanate groups of said polyisocyanate to hydroxyl groups of said polymeric polyol is in the range of about 1.3:1.0 to about 5:1 or (B) the reaction product of said polyisocyanate and said polymeric polyol.

2. A heat curable polyurethane composition consisting essentially of a prepolymer of an organic diisocyanate and a hydroxy terminated polyether or polyester having a molecular weight of from about 150 to 30,000 and an aromatic diamine hardener for said polyurethane composition selected from the compounds having the structural formulae I and II:

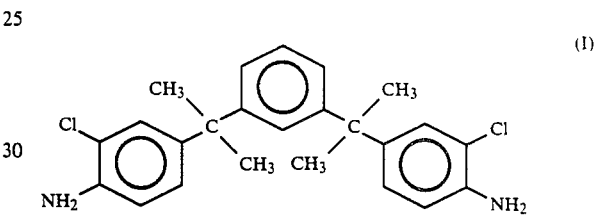

(I)

or

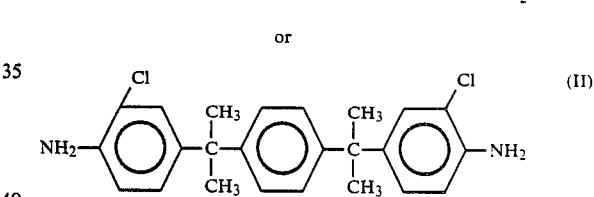

(II)

said prepolymer and hardener being present in an amount to provide a ratio of primary amine to isocyanate of from about 0.85:1.0 to 1:1.

3. A cured polyurethane prepared according to claim 1 wherein the diamine is of structural formula I; the organic polyisocyanate and polymeric polyol reaction product is an isocyanate terminated polyether containing approximately 4% reactive isocyanate.

4. A cured polyurethane prepared according to claim 1 wherein the diamine is of structural formula II; the organic polyisocyanate and polymeric polyol reaction product is an isocyanate terminated polyether containing approximately 4% reactive isocyanate.

5. A cured polyurethane prepared according to claim 1 wherein the diamine is of structural formula I; the organic polyisocyanate and polymeric polyol reaction product is an isocyanate terminated polyester.

6. A cured polyurethane prepared according to claim 1 wherein the diamine is of structural formula II; the organic polyisocyanate and polymeric polyol reaction product is an isocyanate terminated polyester.

7. A heat curable polyurethane according to claim 2 wherein the polyester or polyether has a molecular weight of from 10,000 to 25,000 and the ratio of primary amine to isocyanate is from 0.9:1 to 1:1.

* * * * *